United States Patent [19]

Rowe

[11] 3,744,516

[45] July 10, 1973

[54] COMBINED FILLING DEVICE AND VENT CUT-OFF VALVE FOR ELECTRIC STORAGE CELLS

[76] Inventor: Robert Arnold Rowe, 17 Rue Chasseloup-Laubat, Paris (15 eme), France

[22] Filed: Feb. 26, 1971

[21] Appl. No.: 119,225

[30] Foreign Application Priority Data

Mar. 4, 1970 France ............................... 7007772

[52] U.S. Cl.................. 137/587, 141/285, 136/178
[51] Int. Cl. ........................................... H01m 1/06
[58] Field of Search..................... 137/587, 43, 588, 137/260; 141/198, 285, 301; 136/170, 177, 178, 182, 162; 85/55; 287/53 H; 285/119

[56] References Cited
UNITED STATES PATENTS

| | | | |
|---|---|---|---|
| 2,603,672 | 7/1952 | Reppert | 136/177 |
| 3,508,972 | 4/1970 | Goldingay | 136/170 |
| 2,784,987 | 3/1957 | Corcoran | 285/119 |
| 2,647,159 | 7/1953 | Lighton | 136/177 |

Primary Examiner—Henry T. Klinksiek
Attorney—Young & Thompson

[57] ABSTRACT

A combined filling device and vent cut-off valve for an electric storage cell having a tank with an electrolyte which is adapted to be replenished by distilled water. A stopper mounted on a cover plate is provided for closing the filling hole. The vent cut-off valve is effectively arranged between the space above the electrolyte in the tank and a vent provided in a cover plate and includes a valve member having a piston slidably mounted in a cylinder with a port and operative connected to the cover plate. When the stopper is in position in the filling hole, the valve member is in an open position in which the gas in the space above the electrolyte can escape to the atmosphere via the vent and when the stopper is removed from the filling hole the valve member is automatically closed to prevent the escape of gas to the atmosphere. The device can be mounted on the filling hole of any conventional battery by threaded bushings. The device is adapted for multi-compartment storage cells in which case the cover plate supports each stopper and is operatively connected to each cut-off valve.

11 Claims, 16 Drawing Figures

PATENTED JUL 10 1973 3,744,516

INVENTOR
ROBERT ARNOLD ROWE
By Young & Thompson
ATTYS.

INVENTOR
ROBERT ARNOLD ROWE
By Young & Thompson
ATTYS.

PATENTED JUL 10 1973 3,744,516

INVENTOR
ROBERT ARNOLD ROWE
BY Young + Thompson
ATTYS.

COMBINED FILLING DEVICE AND VENT CUT-OFF VALVE FOR ELECTRIC STORAGE CELLS

The present invention relates to combined filling devices and vent cut-off valves for electric storage cells.

Such devices comprise an electric storage cell having a cover with at least one filling opening and at least one vent hole for releasing gas formed in the cell, as well as a stopper for closing the opening and means for assuring the closure of the vent hole when the opening is unstopped. Such devices are used for example in lead batteries in which losses of water owing electrolytic decomposition are compensated by periodic additions of distilled water.

In a known device the closure of the vent hole to prevent the escape of gas when the filling opening is unstopped is assured by a swinging lead ring or a displaceable ball which closes the vent hole when the stopper is withdrawn. Such a construction causes certain disadvantages, in particular, the sealing provided is inadequate, and therefore the level of the electrolyte in the battery can not be maintained substantially constant.

In other devices the battery is provided with a general cover with a cap which oscillates along a shaft driving a rotary distributor whose length is such that it cooperates with all the compartments of a multi-compartment battery. Such devices lead to a complicated constructions necessitating a very high level of precision in construction in order to avoid jamming and provide adequate sealing. Some known devices neither enable the checking of the specific gravity of the electrolyte nor the emptying of the battery when necessary.

In other devices, the closure of the vent is effected by the displacement of a central sleeve located in the filling opening which enables the opening of the vent holes when a cover plate element is in place and their closure when the element is removed. This system has the disadvantage of reducing the diameter of the filling opening, and the presence of operating members in the filling orifice, however, can cause the downward displacement of a sliding portion operated from the exterior of the battery during the filling operation which may disable the filling cut-off and thereby cause the overflow of electrolyte.

An aim of the present invention is to overcome the above-mentioned disadvantages and to provide a combined filling device and vent cut-off valve in which the vent for releasing gas can be closed in a fluidtight manner in order to enable the addition of liquid sufficient to return the electrolyte to the desired level.

An aspect of the present invention consists in a combined filling device and vent cut-off valve for an electric storage cell having a tank for an electrolyte, a filling hole for replenishing the electrolyte and a vent allowing the escape of gas from the tank to the atmosphere, comprising a stopper for the filling hole, said vent cut-off valve including a valve member slidable mounted in a cylinder between a closed position preventing the escape of gas from the tank through the vent and an open position permitting the escape of gas through the vent, operating means for simultaneously removing the stopper and the closing the valve and for simultaneously re-inserting the stopper and re-opening the valve, and a detent for retaining the valve in its closed position until the operating means brings the stopper into position in the filling hole.

A more particular aspect of the invention consists in a cover for the storage cell comprising a vertical cylinder parallel to the filling hole and having a smooth inner wall and therefore can not grab onto an object extending thereinto, the cylinder is provided with one or more ports corresponding to the volume in the tank above the electrolyte. Further, the cylinder is put into communication with the surrounding atmosphere when a cover plate and the stopper are in position.

The valve member slidably arranged in the cylinder preferably comprises: a head portion, stop means for limiting the upward and downward movements of the valve member, a piston having a diameter substantially equal to that of the inner diameter of the cylinder out of contact with the ports in the cylinder in its normal position and covering over at least one of these ports during filling, means for maintaining the valve member in its closed position which is overcome by a force for releasing the valve member, the stopper being fixed to means for returning the valve member at its open position.

Further the device preferably comprises at least one of the following features: means for limiting the upward movement of the valve member including a stop shoulder having a cross-section greater than that of the rod on which the piston is supported cooperating with the end portion of the cylinder which has an aperture having a cross-section less than that of a disc at the end of the valve member remote from the head portion; the means for limiting the downward movement of the valve member comprising the lower face of the piston cooperating with the end portion of the cylinder; the means for maintaining the valve member in its upper position comprising a detent on the lower portion of the rod remote from the head portion which is adapted to cooperate with a bore having a cross-section such that a substantial force must be exerted in order that the detent pass from one side to the other of the said bore; the means for returning the valve member to its open position including resilient arms adapted to engage under the shoulders formed by the head portion; the stopper being fixed to a cover plate covering the valve and the filling hole and having a vent for the escape of gas; the cover plate having on its lower face means for engaging the head portion of the valve member for returning the same to its open position; a guide tongue is provided on the piston slidable in a slot in the cylinder preferably in the port in communication with the space above the liquid level in the tank of storage cell; the tank of the storage cell including a plurality of compartments and a plurality of stoppers mounted on a common cover plate.

The present invention will now be described by way of example with reference to the accompanying drawings illustrating a combined filling device and vent cut-off valve for electric storage cells in which.

Figure 1:
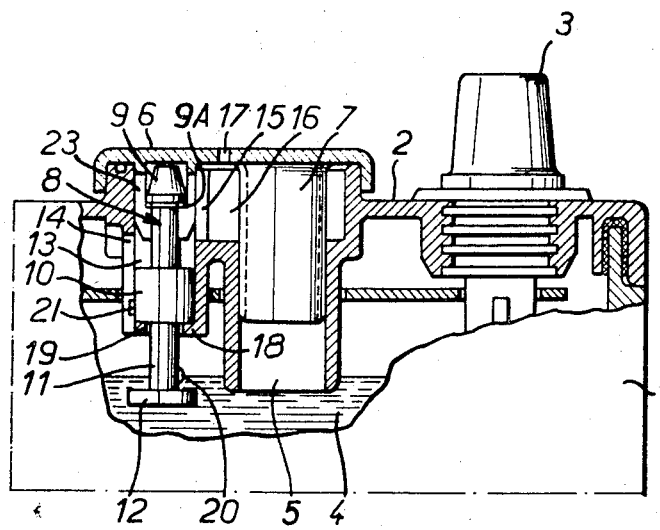
FIG. 1 shows a cross-section of one of the compartments of multi-compartment electric storage cell according to the invention with the stopper in the filling hole and the vent cut-off device in its open position.
Figure 4:
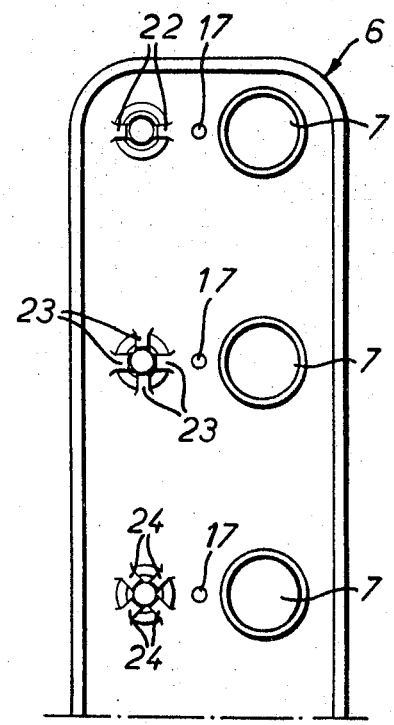
FIG. 4 shows a plan view of the underside of a cover plate illustrating several arrangements of resilient arms.

FIG. 1 shows an electric storage cell having a tank 1 with a plurality of juxtaposed compartments arranged perpendicular to one another; only one of these compartments is shown. A terminal 3 corresponds to this compartment of the cell; an electrolyte 4 is provided in the tank 1. A filling opening 5 is closed with a stopper 7 depending from a cover plate 6. Other stoppers 7 are shown in FIG. 4.

A valve member 8 for controlling the escape of gas comprises a rod with a conical head portion 9 which has an outer diameter greater than the section of the rod immediately therebelow to which it is connected by shoulders 9a. Resilient arms 22, 23 depending from the cover plate 6 have end portions engageable with the shoulders 9a of the head portion, the operation of which will be described in detail below. The valve member 8 includes a piston 10 having a diameter substantially equal to that of cylinder 13 in which it is arranged for sliding movement. The lower surface of the piston 10 comes into abutting contact with a lower end portion 18 of the cylinder 13 and the position of the valve member 8 when the piston 10 is in abutting contact with the lower end portion 18 defines the lower limit of the path of movement of the valve member.

Below the piston 10, valve member 8 includes a rod portion depending from the piston 10 having a diameter less than that of the piston. The lower rod section 11 is adapted to pass through a bore 19 provided in the lower end portion 18 and a disc 12 is disposed at the end of the rod section 11 and is adapted to abut against the lower face of the lower end portion 18 and thereby defines the upper limit of the path of movement of the valve member 8.

The cylinder 13 includes ports 14 formed as a slot for communication with the interior of the tank above the level of the electrolyte and slots 15 for communication with a groove 16 in the cover 2 arranged on the tank 1. The groove 16 extends in the direction perpendicular to the plane of the FIG. 1 and is in communication with the surrounding atmosphere via vent 17 in the cover plate 6.

The bore 19 in the lower end portion 18 of the cylinder has a diameter slightly greater than that of the lower rod section 11. A detent is provided on the rod section 11 in the form of a resilient lateral boss 20 which upon the application of force can pass through the bore 19 but which in its FIG. 2 position maintains the valve in its closed position.

The piston 10 on the valve member 8 is provided with a lateral tongue 21 which is slidable in a slot 14 and the combination thereof acts as a means for guiding the valve member between its open and closed positions.

In the position shown in FIG. 1, the filling opening 5 is closed by the stopper 7 and the space above the level of the electrolyte 4 is in communication with the atmosphere through the intermediary of the slot or port 14, the interior of the cylinder above the upper section of the valve member 8, the slot 15, the groove 16 in the tank cover 2 and finally through the vent hole 17 in the cover plate 6.

Figure 2:
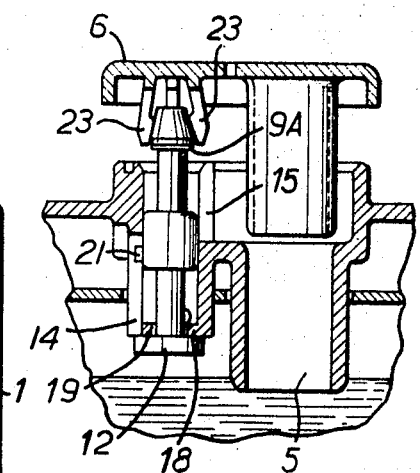
FIG. 2 shows a detail of the filling device and the cut-off valve shown in FIG. 1 with the stopper out of engagement with the filling hole and the cut-off valve in its closed position.

In the position of the device shown in FIG. 2, the cover plate 6 has been moved upwards, and the stopper 7 was just come out of engagement with the filling opening 5. The valve member 8 has been moved upwards by means of the resilient arms 22, 23 extending from the cover plate until the disc 12 on the valve member comes into contact with the lower end portion 18 of the cylinder. Upon the continued upward movement of the cover plate 6, the resilient arms move outwardly and out of engagement with the shoulders 9a as shown in FIG. 2. The piston 10 in FIG. 2 closes the port 14 and thereby prevents the escape of gases while the valve member is in its raised position. The valve member is maintained in its raised position in which the disc 12 is in contact with the lower end portion by means of the detent 20 which having passed through the bore 19 comes into contact with the upper surface of the lower end portion 18 of the cylinder.

The cover plate 6 and the stopper 7 can be completely removed by continuing the upward movement, the resilient arms thus returning to their normal position and the valve member being maintained in its raised position by the detent. Once the cover plate has been removed distilled water can then be poured into the tank through the filling hole 5. Since the gas present in the tank above the electrolyte 4 can not escape, the level to which the electrolyte can rise is thus limited by the pressure exerted by the gas. Accordingly, once the liquid in the tank has reached this level, it begins to rise in the filling opening 5 thus indicating that the required level has been reached. To close the cell, the cover plate 6 is put into position and the stopper enters the filling hole. The water accumulated in the opening 5 seeks its own level as the space containing the captured gas above the electrolyte is brought back into contact with the atmosphere.

FIG. 4 shows the underside of a cover plate 6 on which are mounted three different arrangements of the resilient arms. In the first arrangement the arms 22 comprise a pair of opposed resilient arms. In the next arrangement, four flexible arms 23 are arranged at right angles relative to one another; such an arrangement is shown in FIGS. 1 and 2. In the final arrangement four flexible arms 24 are also at right angles to one another but the orientation relative to the cover plate is displaced through 45°. It should be noted that the resilient arms on a given cover plate will normally all be of the same number and orientation. Finally, these examples are not considered all-inclusive.

Figure 5:
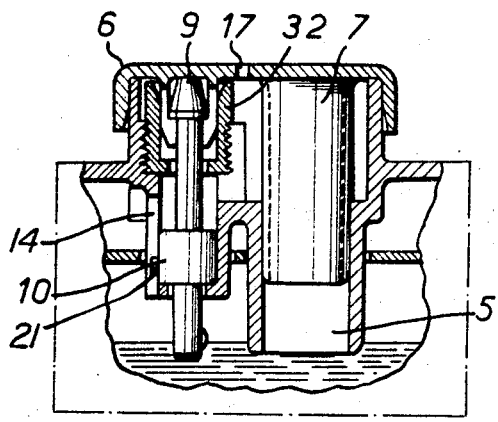
FIG. 5 shows an alternative embodiment in section of the device according to the invention in a position corresponding to FIG. 1.
Figure 6:
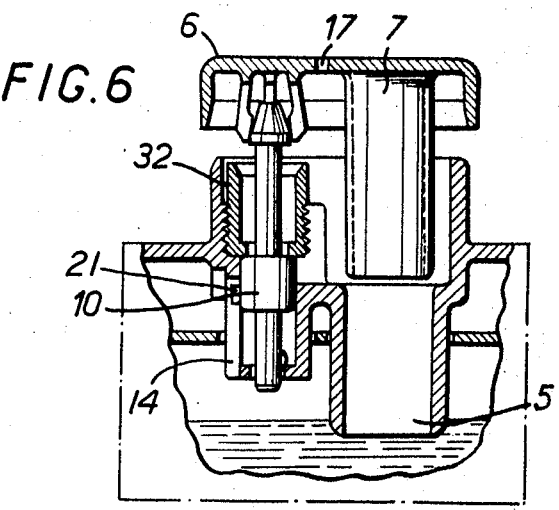
FIG. 6 shows the embodiment of FIG. 5 in the position corresponding to FIG. 2.

In the embodiment shown in FIGS. 5 and 6, the disc 12 has been replaced by stop means arranged at upper limit of the path of movement of the piston 10. The stop means comprises a cylindrical element 32 having external screw threads which mount it in the body of the cell. Accordingly, as shown in FIG. 6, the piston 10 of the valve member 8 comes to abut against the stop member 32 to define the upper limit of the path of movement of the valve member. The operation is the same as that shown in the embodiment of FIGS. 1–3.

Figure 7:
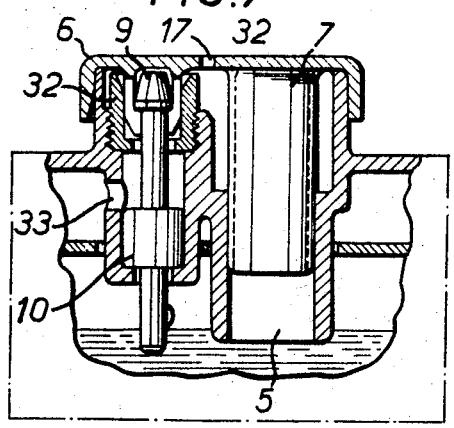
FIG. 7 shows a further alternative embodiment in section in a position corresponding to FIG. 1.
Figure 8:
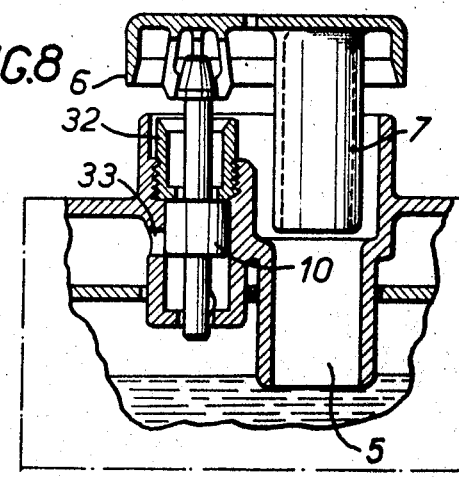
FIG. 8 shows the embodiment of FIG. 7 in a position corresponding to FIG. 2.

The embodiment of FIGS. 7 and 8 employs the same type of upper limit stop means 32 as shown in the previous embodiment. The guiding tongue as well as the slots 14 and 15 have been eliminated in this embodiment. Instead of the slots, a hole 33 is provided in the wall of the cylinder through which gas may pass from the tank to the vent 17 through the same passage-way as described above. In its raised position the piston 10 seals off the port 33 thus preventing the escape of gas.

Figures 9, 10, 10A:
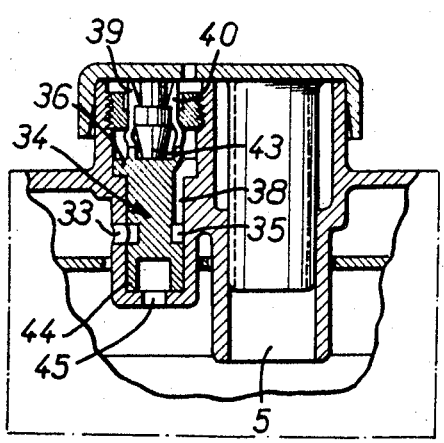
FIG. 9 shows a still further embodiment of the device according to the invention in a position corresponding to FIG. 1.
FIG. 10 shows an elevation view with a cut away portion of the valve member of the embodiment shown in FIG. 9.
FIG. 10A shows a plan view of valve member of FIG. 10.
Figure 11:
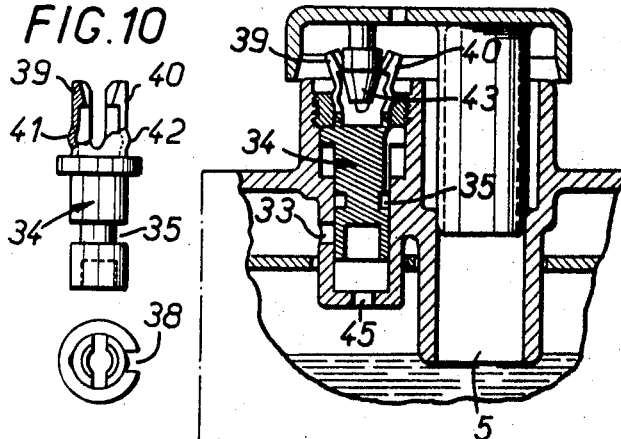
FIG. 11 shows a view in section of the embodiment shown in FIG. 9 in a position corresponding to FIG. 2.

FIGS. 9–10 show a further alternative embodiment in which the valve member 34 and the means for raising the valve member to the closed position are different. In this embodiment the valve member is provided with resilient arms 39 engageable with a male portion depending from the cover plate 6. FIG. 9 shows the position enabling the escape of gas from the tank : the gas passes through the port 33, then through an annular groove 35, a passage 38 running upwards between the arms and the vent hole. Stop means for limiting movement is provided by a collar 36 engageable with a shoulder formed by the cylinder to define the lower limit and a threaded sleeve 37 to define the upper limit of movement. The piston portion 44 of the valve member seals off the port 33 in the raised position as shown in FIG. 11. The valve member is maintained in its closed position by the detent portions 41 and 42 provided on the resilient arms 39 and 40 respectively. The lower end portion of the cylinder is provided with a bore 45 in order to alleviate the back-pressure which may be produced in returning the valve member to its closed position.

Figure 12:
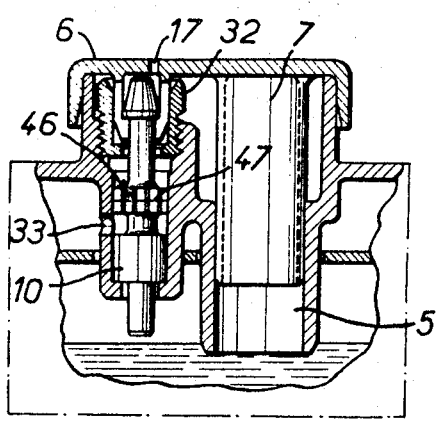
FIG. 12 shows a view in section of a further alternative embodiment of the device according to the invention in a position corresponding to FIG. 1.
Figure 13:
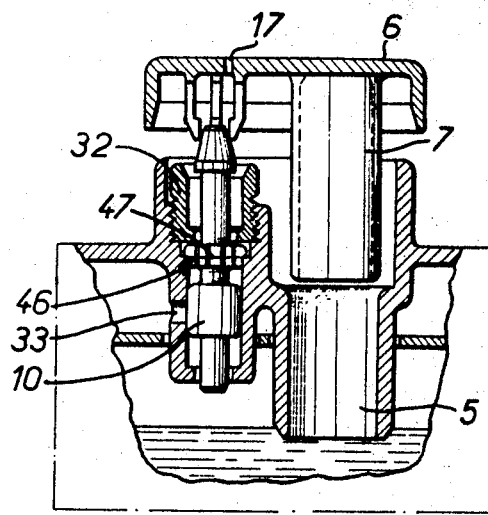
FIG. 13 shows a view in section of the embodiment of FIG. 12 in a position corresponding to FIG. 2.

In the embodiment of FIGS. 12 and 13 which is similar to that of FIGS. 7 and 8 but in which the valve member includes an intermediate enlarged section 46 spaced from the piston 10, the intermediate enlarged section is arranged so that its lower surface is substantially in alignment with the top of the port 33 in the open position as shown in FIG. 12. In this position the gas can escape from the tank to the atmosphere passing through the port 33, vertical passages 47 provided in the intermediate enlarged section 46 and upwards to the vent hole 17. In the closed position shown in FIG. 13 the port 33 is blocked by the piston 33 thereby preventing the escape of gas during the filling operation.

It should be noted that the intermediate enlarged section 46 is formed of flexible material and has a diameter slightly greater than the cylinder. In FIG. 12 the section 46 is compressed. In FIG. 13, the upper portion of the intermediate section 46 extends beyond the inner wall of the cylinder and acts as a detent to maintain the valve member in its closed position until a force is exerted thereon to return the valve member to its open position as shown in FIG. 12.

Figure 14:
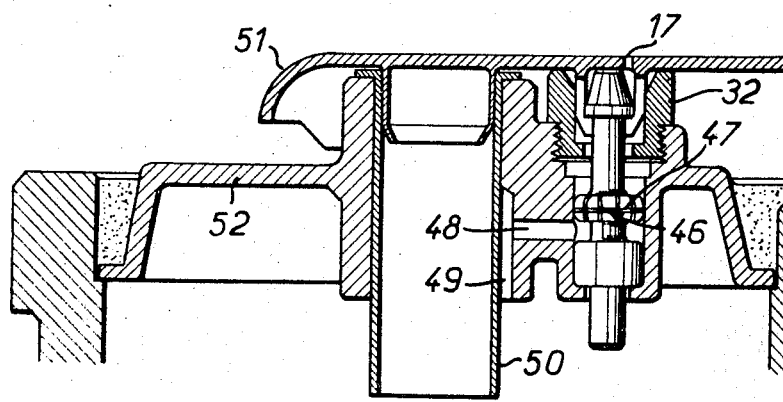
FIG. 14 shows a view in section of a still further embodiment of the device according to the invention.

FIG. 14 shows a further variation of the invention which concerns, in particular, the cover 52 for the tank. In the embodiment of FIG. 14, the moulded cover comprises a vertical sleeve 50 connected to the interior of the vent valve mechanism by a channel 48 and by a vertical passage 49 partially delimited by a sleeve 50 extending along the cylinder 15. The cover plate 51 is formed of a semi-rigid material, such as polythene, and includes depending resilient arms and stoppers. The entire cover plate 51 with the stopper and the resilient arms is preferably moulded as a unitary body. This embodiment operates in exactly the same way as those of FIGS. 1–13, described above. The valve member is the same as that shown in FIGS. 12 and 13. Any of the other valve members described above may be used instead of the one illustrated herein.

Figure 3:
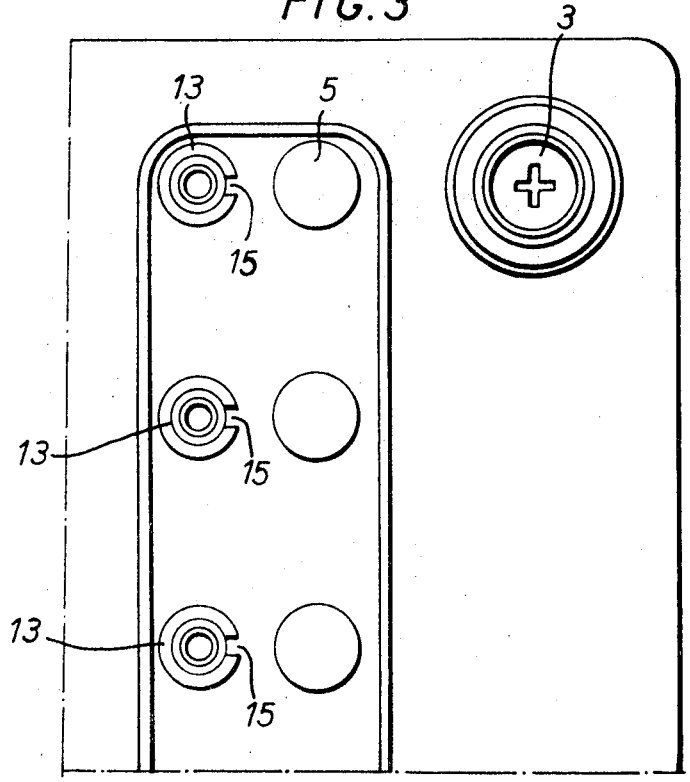
FIG. 3 shows a top view of the storage cell shown in FIG. 1 with the cover-plate removed therefrom.

In the present embodiment and in the following embodiment the orientation of the cut-off valve and the filling hole are different, i.e., instead of the arrangement shown in FIG. 3 they are aligned along a single axis rather than the two axes shown in FIG. 3.

Figure 15:
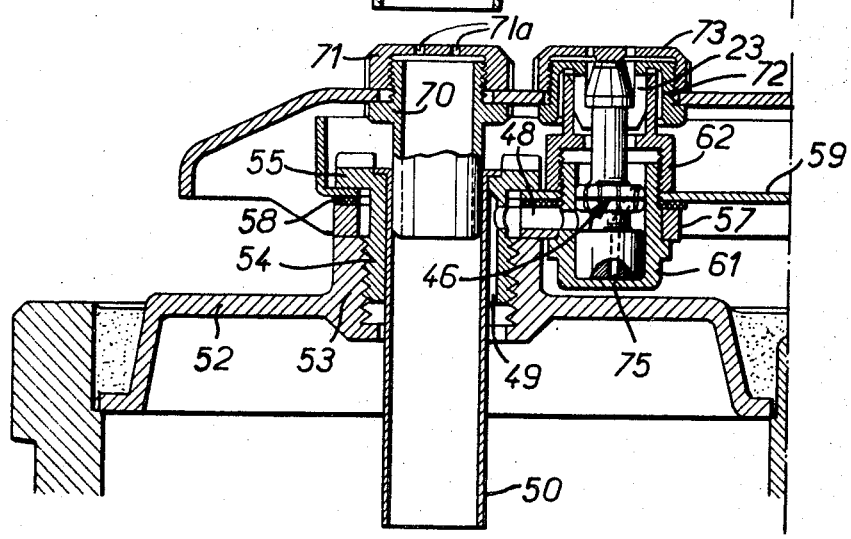
FIG. 15 shows a final alternative embodiment of the device according to the invention.

FIG. 15 shown a final preferred embodiment of the device according to the invention. Unlike the previous embodiments the present embodiment is adapted to be used on a conventional battery such as those commonly in use. To this end the screw-threaded filling holes of the battery which are normally adapted to receive the screw-threaded plugs are in the present embodiment adapted to receive the combination according to the invention.

In this embodiment the tank cover 52 has conventionally screw-threaded filling hole 53 which is adapted to receive a cooperatively threaded bushing 54 which in turn supports therein a sleeve 50 secured thereto in any suitable manner, for example, by force fitting. The bushing 54 has an outwardly extending flange 55 at its upper end. Between the sleeve 53 forming the filling hole and the flange 55 are clamped a support plate 57, a sealing member 58 and a unitary plate member 59 which is common to all of the compartments of the battery only one of which is shown. The support plate 57 is provided with a horizontal passage 48 as in the preceding embodiment.

Functionally the vent cut-off valve is the same as that of FIGS. 12–14. However, in this embodiment the cylinder 61 is threadedly connected to the upper limit stop means 62. The entire combination formed of the filling device and vent cut-off valve is effectively supported on the screw-threaded filling hole 53.

Instead of the integral cover plate structure shown in the previous embodiments the cover plate 56 cooperates with a stopper having two pieces 70,71. The cylindrical portion 70 has a flange engageable with the underside of the cover plate 56 and external screw threads at its upper end. The screw threaded nut 71 has vents 71a therethrough and internal screw threads which cooperate with the threads on the cylinder 70. The resilient arms 23 are connected to an annular externally threaded element 72. A threaded nut 73 is in cooperative engagement with the element 72, the cover plate 56 is sandwiched therebetween. It is noted, however, that the threaded elements for the cover plate of the present embodiment could be replaced with the integral construction of the preceding embodiments.

The piston 10 is provided with a channel 75 extending from the bottom of the piston and in communication with the passageway to the vent hole above the intermediate enlarged section 47 to enable the release of gas under pressure trapped between the piston and the cylinder.

Needless to say there are various possible modifications of the device described herein falling within the scope of the invention in particular certain elements could be replaced by their equivalents. For example, the means which limit the path of travel of the valve member in the cylinder could be provided on the cylinder or on the valve member and/or at different levels.

What I claim is:

1. A combined filling device and vent cut-off valve for an electric storage cell having a plurality of compartments each containing electrolyte, a filling hole for replenishing the electrolyte, and a vent allowing the escape of gas from the compartments to the atmosphere, comprising a plurality of stoppers, each stopper being engageable with an associated said filling hole, a plurality of vent cutoff valves, each vent cut-off valve being disposed between a space above the electrolyte in an associated said compartment and an associated said vent, each said valve including a valve member axially slidably mounted in a cylinder whose axis is parallel to and spaced from the axis of the associated filling hole, and a port extending through the wall of said cylinder, each port being in communication with the space above the electrolyte and its associated vent, each valve member having a first position in which its associated port is open and a second position in which said associated port is closed, an operating member for inserting and removing all the stoppers from their filling holes and for simultaneously opening and closing all the valves respectively, and detent means for positively retaining each valve in said second position until said operating member brings the stoppers into position in the filling holes.

2. A device according to claim 1, wherein stop means are provided for limiting the movement of the valve member between said first position and said second position.

3. A device according to claim 2, wherein one stop means is mounted at the upper end of the cylinder, and wherein another stop means is formed by the lower end of the cylinder.

4. A device according to claim 3, wherein a disc is provided at the lower end of the valve member cooperating with the lower stop means in said second position.

5. A device according to claim 1, wherein the valve member includes a piston mounted on a rod for movement in the cylinder, the diameter of the piston being substantially equal to the interior diameter of the cylinder.

6. A device according to claim 5, wherein a portion of the rod depends from the piston, the detent being mounted on said portion of the rod and wherein the lower end of the cylinder has a bore whose diameter is greater than that of said portion of the rod but less than the effective diameter of the rod portion at the detent.

7. A device according to claim 5, wherein the detent means comprises an enlarged section disposed above the piston and spaced therefrom said enlarged section being formed of resilient material which is compressed by the cylinder in the first position and is adapted to expand in a space disposed above the cylinder in the second position for maintaining the valve member in said second position.

8. A device according to claim 1, wherein the operating means comprises a cover plate on which is supported said stopper and means engageable with the valve member, and wherein the vent is arranged in the cover plate.

9. A device according to claim 1, further comprising means releasably connecting the operating means to the valve member including a head portion defining shoulders and resilient arms releasably engageable with the shoulders.

10. A device according to claim 1, wherein a tongue is provided on the piston adapted to cooperate in the port which is formed as a vertical slot in the cylinder for guiding the valve member between said first and second positions.

11. A device according to claim 1, wherein the filling hole is internally threaded and further comprising an externally threaded bushing on which the vent cut-off valve is supported and in which is positioned a sleeve the stopper being cooperatively engageable with said sleeve.

* * * * *